United States Patent [19]
Nevin

[11] Patent Number: 5,826,969
[45] Date of Patent: Oct. 27, 1998

[54] ILLUMINATING SCREW DRIVER

[76] Inventor: Donald Nevin, 3 Clearmeadow Ct., Woodbury, N.Y. 11797

[21] Appl. No.: 922,099

[22] Filed: Sep. 2, 1997

[51] Int. Cl.⁶ ...................................................... F21V 8/00
[52] U.S. Cl. ............................... 362/120; 362/32; 362/119
[58] Field of Search .............................. 362/32, 119, 120, 362/253, 205, 208

[56] References Cited

U.S. PATENT DOCUMENTS

| | | | |
|---|---|---|---|
| 1,603,985 | 7/1926 | Rosenberg | 362/120 |
| 2,670,427 | 2/1954 | Barlet et al. | 362/120 |
| 4,107,765 | 8/1978 | Singleton et al. | 362/120 |
| 4,283,757 | 8/1981 | Nalbandian et al. | 362/120 |
| 4,936,171 | 6/1990 | Berg | 81/451 |
| 5,124,893 | 6/1992 | Jeng | 362/120 |
| 5,211,468 | 5/1993 | Jeng | 362/120 |
| 5,369,555 | 11/1994 | McKain et al. | 362/120 |
| 5,628,556 | 5/1997 | Hraber et al. | 362/119 |

*Primary Examiner*—Stephen F. Husar
*Attorney, Agent, or Firm*—Robert L. Epstein; Harold James; James & Franklin

[57] ABSTRACT

The handle defines a cavity retaining a power source and a source of illumination. The shaft, mounted on one end of the handle, has a channel extending from the handle and through the blade for guiding light down the shaft and out the blade to illuminate the area proximate the front of the blade. The blade is bifurcated, spaced tip portions being situated on either side of the channel.

13 Claims, 3 Drawing Sheets

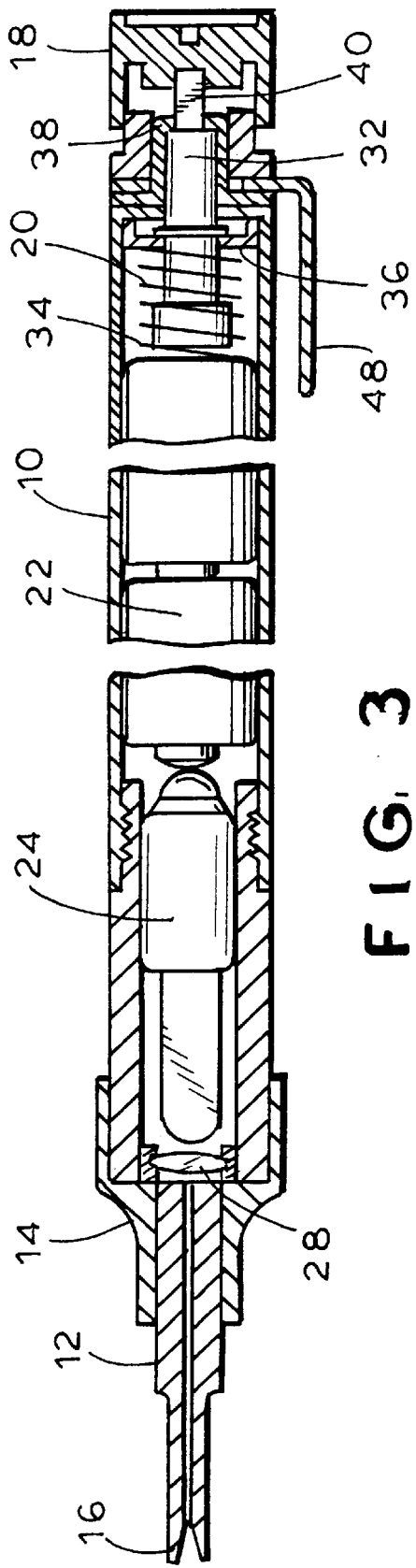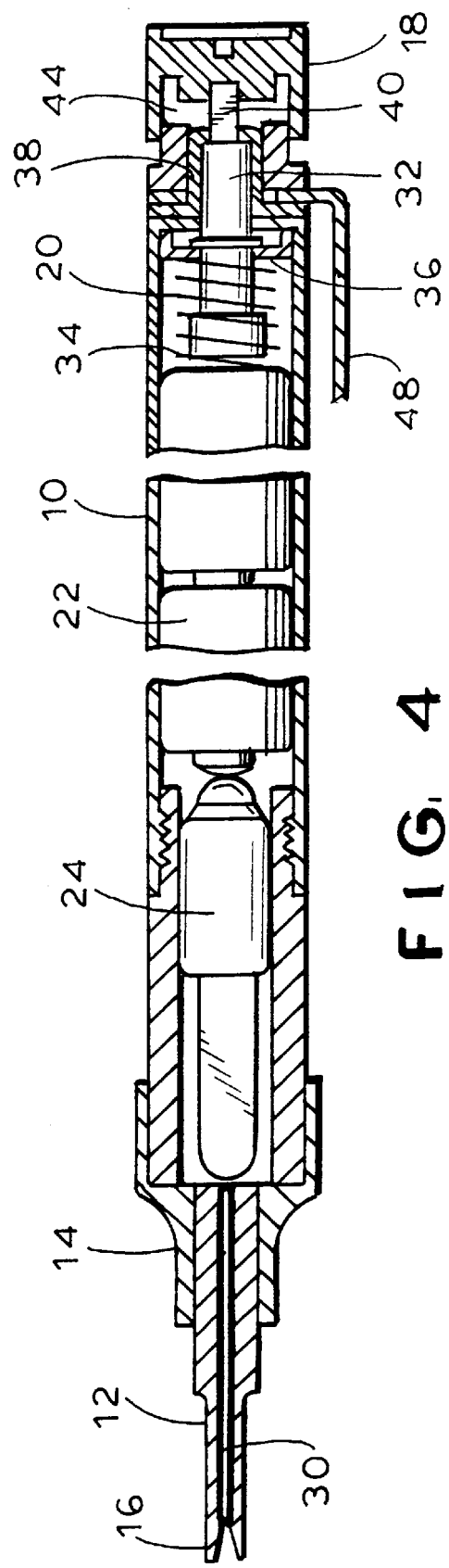

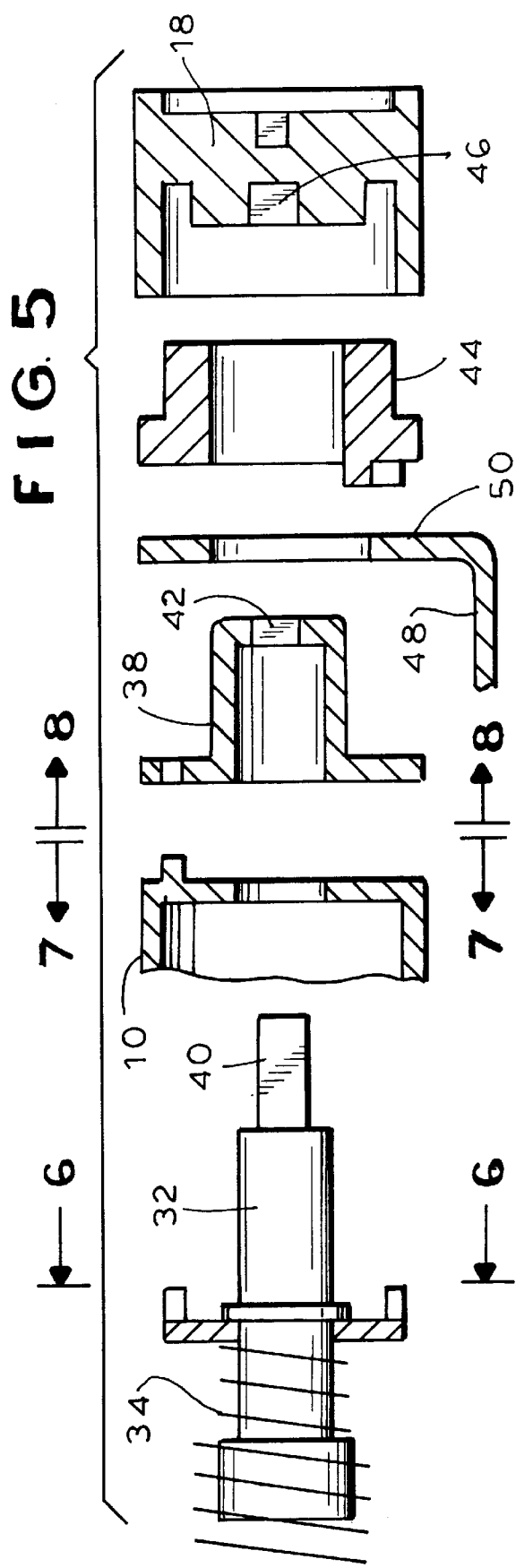
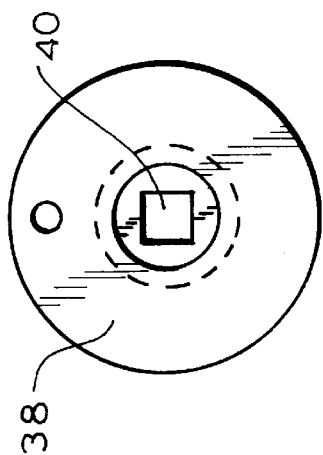
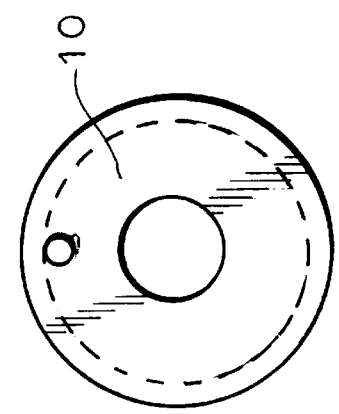
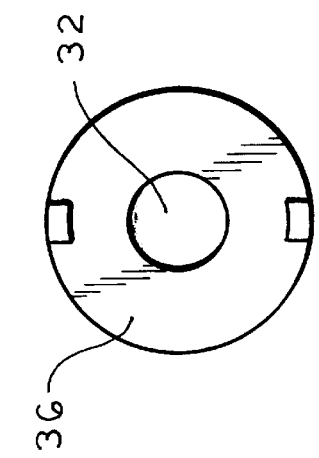

ILLUMINATING SCREW DRIVER

The present invention relates to tools for driving fasteners such as screws and more particularly to a screw driver capable of illuminating the area proximate the front of the blade.

Tools for driving fasteners such as screws are common. Conventional tools of this type include a solid handle, made of wood, plastic or metal from which a metal shaft extends. The screw engaging end of the shaft is shaped to be received in a correspondingly shaped recess in the screw head. For conventional screws, the shaft end is tapered to form a blade.

Screw drivers sometimes must be used poorly lighted places. In such instances, a light source may be required to provide sufficient light to enable the user to align the tool and the screw. A flashlight or other portable light source could be used if space permits, but such devices must be held by the user, forcing the user to manipulate the driver and screw with one hand, while holding the light source with the other. Often, however, there is not enough space to accommodate such a light.

In order to overcome this problem, screw driver handles have been fashioned to include an energizing source, such as a battery, and a bulb which shines light along the exterior of the shaft, toward the blade. See Singleton, U.S. Pat. No. 4,107,765; Nalbandian U.S. Pat. No. 4,253,757; McKain U.S. Pat. No. 5,369,555; Berg, U.S. Pat. No. 4,936,171 and Barlet et al. U.S. Pat. No. 2,670,427. However, because the light tends to spread out as it travels and because of the limitations on the light out-put of a battery operated bulb, these arrangements have proven less than adequate in illuminating the area immediately in front of the blade.

Rosenberg U.S. Pat. No. 1,603,985 unsuccessfully attempted to overcome this problem by placing the bulb within the shaft. This required a very small bulb and weakened the shaft considerably. Jong-Pyng Jeng, in U.S. Pat. Nos. 5,124,893 and 5,211,468, mounted bulbs in a member which slides along the shaft. This situated the bulbs close to the screw engaging end of the screw driver but was extremely cumbersome, obstructed the blade from view and required an exposed wire extending from the slideable member to the handle where the battery is located.

My invention overcomes the disadvantages of prior art structures by incorporating a light guiding channel along the interior of the shaft, which extends through the blade. The channel prevents the light from spreading as it travels down the shaft, thereby concentrating the light beam on the area proximate the front of the blade and maintaining a relatively high light intensity on the area being illuminated.

It is, therefore, a prime object of the present invention to provide an illuminating screw driver in which light is guided along an internal channel extending along the shaft and through the blade so as to provide concentrated light on the area proximate the blade.

It is another object of the present invention to provide an illuminating screw driver which includes a bifurcated blade, the tip portions of which are spaced by a distance equal to the diameter of the channel.

It is another object of the present invention to provide an illuminating screw driver which is light in weight and easy to manipulate, with a rotary switch and pocket clip.

In accordance with the present invention, an illuminating screw driver is provided comprising a handle with a shaft mounted on one end. The handle has a wall defining a cavity. Electrical energizing means, such as a battery, and an illumination source, such as a bulb, are situated within the cavity, with the bulb facing the end of the handle. Means are adapated, when actuated, to electrically connect the battery to the bulb. The shaft includes a screw engaging end. A channel extends along the shaft and through the screw engaging end. The channel guides light from the bulb through the shaft and out the screw engaging end to illuminate the area proximate the screw engaging end.

The screw engaging end is tapered to form a blade. The blade is bifurcated. The blade includes first and second aligned tip sections spaced apart a distance substantially equal to the diameter of the channel. A "V" shaped recess is interposed between the tip sections and aligned with the channel.

A light reflecting coating may be deposited on the inside of the channel to increase reflectivity. A lens may be used to focus the light from the bulb. A light transmissive rod or optical fibers can be used to guide light down the channel.

The electrical connecting means comprises a switch with a moveable actuator. The actuator is preferrably rotatable. Means are provided for gripping the actuator. The gripping means are mounted proximate the end of the handle. Clip means may also be mounted proximate the end of the handle.

To these and such other objects as may hereinafter appear, the present invention relates to an illuminting screw driver as set forth in detail in the following specification and recited in the annexed claims, taken together with the accompanying drawings in which like numerals refer to like parts and in which:

FIG. 3 is an enlarged side cross-sectional view of a second preferred embodiment of the screw driver;

FIG. 4 is an enlarged side cross-sectional view of a third preferred embodiment of the screw driver;

FIG. 5 is an enlarged exploded cross-sectional view of the rotary switch mechanism;

FIG. 6 is an enlarged cross-sectional view taken along line 6—6 of FIG. 5;

FIG. 7 is an enlarged cross-sectional view taken along line 7—7 of FIG. 5; and

FIG. 8 is an enlarged cross-sectional view taken along line 8—8 of FIG. 5.

Figure 1:
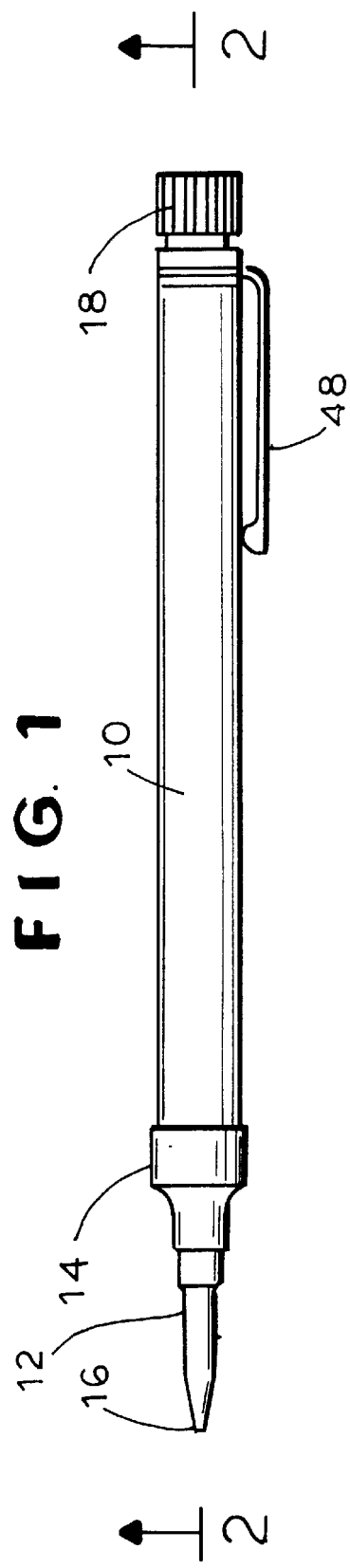
FIG. 1 is a side elevational view of the screw driver of the present invention.

As seen in the figures, the screw driver of the present invention includes a tube-like handle 10 made of plastic, wood, metal or any combination thereof. A shaft 12, mounted on a cap 14, is received on and secured to one end of handle 10. Shaft 12 is made of metal and at the screw engaging end has a tapered tip which forms blade 16. Removeably mounted on the other end of handle 10 is a rotary switch 20. Switch 20 includes a gripping member 18 at the end of the handle.

Figure 2:
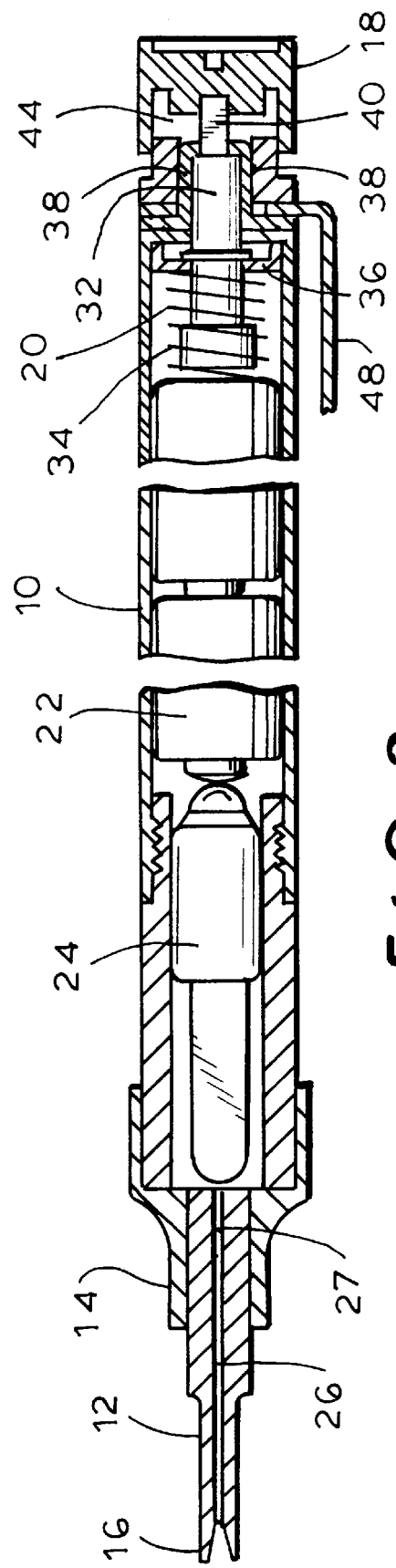
FIG. 2 is an enlarged side cross-sectional view of a first preferred embodiment of the screw driver.

As best seen in FIG. 2, handle 10 is hollow and, in addition to switch 20, receives therein an energizing source, such as one or more batteries 22 and an illuminating source, such as bulb 24. Switch 20, when actuated, serves to complete an electrical circuit between the battery and bulb to energize the bulb.

Shaft 12 is provided with an internal channel 26 which begins adjacent the bulb and extends along the shaft and through the blade 16. Blade 16 is bifurcated, with a "V" shaped notch separating the two tip portions. Channel 26 serves to guide light from bulb 24 through shaft 12 and out of the blade to illuminate the area proximate the front of the blade. The interior wall of shaft 12 may be coated with a light reflecting layer 27 to increase to increase reflectivity.

To further focus the light on the desired area, a lens 28 of plastic on glass may be interposed between the bulb and the mouth of the channel, as shown in FIG. 3. Alternatively, light transmissive means 30, such as a rod or an optical fiber bundle may be situated within the channel 26, as shown in FIG. 4.

As seen in FIGS. 5–8, switch 20 includes a rotatable part 32 which is electrically connected to one end of battery 22 by metal spring 34. Mounted on part 32 is a flange 36 (FIG. 6) which is spaced from the interior wall of the end of handle 10. Cap 38 fits over the end of handle 10 and covers part 32. A protrusion and recess cooperate to retain cap 38 stationary relative to handle 10. End 40 of the part 32 extends through opening 42 in cap 38.

Spacer 44 fits over cap 38. Cylindrical gripping portion 18 fits over spacer 44 and engages end 40 in recess 46. Rotating gripping portion 18 rotates end 40 and thus part 32 to make or break the electrical circuit connection between bulb 24 and battery 22. This is done by connecting or disconnecting spring 34 with the base of bulb 24 through the handle itself, if metal, or through a conductive strip or wire provided for this purpose.

A pocket clip 48 may be provided. Clip 48 includes a ring-like section 50 which is received over cap 38, between the base of the cap and spacer 44.

It will now be appreciated that the present application relates to an illuminated screw driver in which the light guide channel extends along the shaft and through the bifurcated blade to focus light on the area proximate the blade.

While only a limited number of embodiments of the present invention have been disclosed for purposes of illustration, many variations and modifications could be made thereto. It is intended to cover all of these variations and modifications which fall within the scope of the invention, as defined by the following claims.

I claim:

1. An illuminating screw driver comprising a handle, a shaft mounted on said handle, said handle comprising a wall defining a cavity, illuminating means, means for energizing said illuminating means, said energizing means and said illuminating means being situated within said handle cavity, means adapted when actuated for electrically connecting said energizing means and said illuminating means, said shaft comprising a screw engaging end and a channel extending from said handle through said screw engaging end, said channel guiding light from said illuminating means along said shaft to an area proximate said screw engaging end, said screw engaging end comprising a blade.

2. The driver of claim 1 wherein said blade is bifurcated.

3. The driver of claim 1 wherein said blade comprises first and second tip sections spaced apart a distance substantially equal to the diameter of said channel.

4. The driver of claim 1 wherein said blade comprises first and second tip sections and a "V" shaped recess interposed between said tip sections and aligned with said channel.

5. The driver of claim 1 wherein said connecting means comprises a moveable actuator.

6. The driver of claim 5 wherein said actuator is rotatable.

7. The driver of claim 5 further comprising means for gripping said actuator, said gripping means being mounted proximate the end of said handle.

8. The device of claim 1 further comprising clip means mounted proximate the end of said handle.

9. The devices of claim 1 further comprising light transmissive means situated in said channel.

10. An illuminating screw driver comprising a handle, a shaft mounted on said handle, said handle comprising a wall defining a cavity, illuminating means, means for energizing said illuminating means, said energizing means and said illuminating means being, situated within said handle cavity, means adapted when actuated for electrically connecting said energizing means and said illuminating means, said shaft comprising a screw engaging end and a channel extending from said handle through said screw engaging end, said channel guiding light from said illuminating means along said shaft to an area proximate said screw engaging end, said channel being defined in part by a wall and further comprising a light reflecting coating on said channel wall.

11. An illuminating screw driver comprising a handle, a shaft mounted on said handle, said handle comprising a wall defining a cavity, illuminating means, means for energizing said illuminating means, said energizing means and said illuminating means being situated within said handle cavity, means adapted when actuated for electrically connecting said energizing means and said illuminating means, said shaft comprising a screw engaging end and a channel extending from said handle through said screw engaging end, said channel guiding light from said illuminating means along said shaft to an area proximate said screw engaging end, a lens interposed between said illuminating means and said channel.

12. An illuminating screw driver comprising a handle, a shaft mounted on said handle, said handle comprising a wall defining a cavity, illuminating means, means for energizing said illuminating means, said energizing means and said illuminating means being situated within said handle cavity, means adapted when actuated for electrically connecting said energizing means and said illuminating means, said shaft comprising a screw engaging end and a channel extending from said handle through said screw engaging end, said channel guiding light from said illuminating means along said shaft to an area proximate said screw engaging end and light transmissive means situated in said channel, said light transmissive means comprising a fiber optic bundle.

13. An illuminating screw driver comprising a handle, a shaft mounted on said handle, said handle comprising a wall defining a cavity, illuminating means, means for energizing said illuminating means, said energizing means and said illuminating means being situated within said handle cavity, means adapted when actuated for electrically connecting said energizing means and said illuminating means, said shaft comprising a screw engaging end and a channel extending from said handle through said screw engaging end, said channel guiding light from said illuminating means along said shaft to an area proximate said screw engaging end, said screw engaging end being bifurcated.

* * * * *